United States Patent [19]
Kuznetsov et al.

[11] Patent Number: 4,602,179
[45] Date of Patent: Jul. 22, 1986

[54] HOMOPOLAR DYNAMOELECTRIC MACHINE WITH AN AUXILIARY FIELD COIL

[75] Inventors: Stephen B. Kuznetsov, Washington, D.C.; Lee A. Kilgore, Murrysville, Pa.

[73] Assignee: Westinghouse Electric Corp., Pittsburgh, Pa.

[21] Appl. No.: 677,769

[22] Filed: Dec. 3, 1984

[51] Int. Cl.⁴ ............................................. H02K 31/00
[52] U.S. Cl. .................................. 310/178; 310/219; 310/249; 310/256
[58] Field of Search .............. 310/178, 254, 219, 259, 310/232, 248, 208, 179, 256, 180, 186, 188, 187, 249, 284; 336/84 M; 322/48

[56] References Cited

U.S. PATENT DOCUMENTS

| | | | |
|---|---|---|---|
| 3,229,133 | 1/1966 | Sears | 310/178 |
| 3,736,450 | 5/1973 | Emaldi | 310/178 |
| 4,271,369 | 6/1981 | Stillwagon | 310/219 |
| 4,499,392 | 2/1985 | Giacoletto | 310/178 |
| 4,521,709 | 6/1985 | Saint-Michel | 310/178 |

FOREIGN PATENT DOCUMENTS

| | | | |
|---|---|---|---|
| 0238300 | 6/1964 | Austria | 310/178 |
| 0105728 | 10/1979 | Japan | 336/84 M |

*Primary Examiner*—R. Skudy
*Attorney, Agent, or Firm*—R. P. Lenart

[57] ABSTRACT

A drum type homopolar dynamoelectric machine includes a rotor, a main field coil and an auxiliary field coil. The field coils encircle different portions of the rotor and are supported by a stator structure having a main pole piece for directing magnetic flux produced by current flowing in the main field coil radially into a section of the rotor. A current transfer assembly makes sliding electrical contact with a current collecting zone on the surface of the rotor which is axially positioned between the main and auxiliary field coils. Current flowing in the auxiliary field coil tends to reduce the amount of leakage flux in the current collecting zone produced by current flowing in the main field coil. This reduces undesirable circulating currents in the rotor current collecting zone and the associated current collecting structures.

11 Claims, 9 Drawing Figures

HOMOPOLAR DYNAMOELECTRIC MACHINE WITH AN AUXILIARY FIELD COIL

BACKGROUND OF THE INVENTION

This invention relates to dynamoelectric machines and more particularly to drum type homopolar machines.

Drum type homopolar dynamoelectric machines include a stationary excitation system and a rotating drum composed of a combination of ferromagnetic and highly conductive materials configured such that a direct current output voltage is produced along the axial length of the drum. These machines incorporate a set of current collection members at either axial end of the rotor, which carries full load current. Homopolar dynamoelectic machines may operate as either a motor or generator and are particularly suited to transfer energy in short, high current pulses to a storage inductor and a final load consisting of a resistive-inductive system, as for example, an electromagnetic projectile launcher. The rotor of drum type homopolar machines may include a cylindrical shell of a highly conductive, non-ferromagnetic material which generates and supports the full load current. This member is bonded or shrunk onto a ferromagnetic inner cylindrical core which serves as the main rotor body and is directly attached to a drive or input shaft. Both components of the rotor are, preferably, homogeneous materials without segmentation or any combination of axial or circumferential grooves. Since modern current collectors may operate at a current density of between 10 and 15 kiloamps per square inch, it is imperative that the rotor surface on the two axial ends be smooth since this zone is used exclusively for current collection with, for example, solid metal-graphite brushes. The machine's internal electromotive force is confined to an axial zone along the center of the rotor between the two outer current collection zones.

Drum type homopolar machines may be classified as truncated drum or full drum types according to the relative rotor active length. The excitation system includes a stator having a main pole which is used to confine the magnetic flux to a zone of the rotor which is directly in line radially with the main pole piece. It is desirable that the total machine flux should only cut the rotor surface at a location which is separated from the current collecting zone. In practical machines, with significant iron-iron air gaps, magnetic saturation of the core material or poles and conventional pole tip geometries, an amount of leakage flux will typically pass from the main pole said across the air gap at a non-radial angle and enter the rotor magnetic circuit through the current collection zone. It is this leakage flux which causes an additional voltage to be generated in the rotor zone under the brushes. The particular construction of a rotor shell which includes a continuous homogeneous cylinder in conjunction with the use of a relatively long brush collector at each end creates additional induced electromotive force due to the leakage flux that results in large continuous circulating current in closed, short circulating loops composed of the rotor conductor and each brush box at every point along the circumference.

In the design of both truncated drum and full drum, conventional homopolar machinery, corrective measures have been implemented to reduce the severity of the stray magnetic field not directly forming in the active air gap area. Certain techniques for improving machine reliability although not performance, reduce the thermal stress associated with higher than average brush-to-rotor circulating currents and the consequent, sometimes unpredictable, temperature rises. Some of the conventional techniques used previously for reducing stray air gap magnetic fields are as follows:

1. Keeping the collector length as small as possible by increasing the collector current density;
2. Increasing the rotor diameter of the machine with a significant decrease in rotor collector length;
3. Changing the radial thickness of the conductor rotor shell between active and collector zones so that the active zone contains the rotor shell segment with the least amount of non-ferromagnetic material;
4. Using a solid ferromagnetic rotor without a conductive shell but plating the rotor core in the current collection zone with a highly conductive material so as to maintain a minimum air gap in the active region;
5. Shielding the current collection system with a non-ferromagnetic, highly electrically conductive enclosure and necessitating that surface eddy currents provide screening for those applications which are strictly of a time transient or pulsed operation; and
6. Extending the null-flux zone of the current collection area, but adding a necessary axial length to the stator frame which usually results in large unutilized air spaces in the machine.

Other methods which do not generally decrease the stray magnetic field but tend to lessen the possibility of heavy circulating currents include:

1. Attaching each current collection module to separate load circuits or extending the lead length of individual brush modules so as to increase the effective resistance of this circulating current path; and
2. Modifying the rotor to increase the effective rotor surface axial resistance path for circulating currents above the resistance encountered for currents flowing in a singularly radial direction.

In the interest of building lightweight and extremely compact machine designs, often with a low moment of inertia, all of the above conventional methods have proven to be cumbersome and unable to meet minimum weight criteria. In assessing any conventional homopolar generator, a significant percentage of total field magnetomotive force or ampere turns directly contributes to magnetizing the rotor in undesirable zones and even in locations such as the bearing supports. A copending commonly assigned application Ser. No. 677,768, filed Dec. 3, 1984, and entitled "HOMOPOLAR DYNAMOELECTRIC MACHINE WITH A SHIELDED STATOR EXCITATION COIL", discloses a homopolar machine having a flux shield on the main stator excitation coil to reduce stray magnetic field in the current collection zone and is hereby incorporated by reference.

SUMMARY OF THE INVENTION

The present invention seeks to reduce circulating current in the current collecting zone of the rotor and the associated current collecting structure of a drum type homopolar machine, by diverting leakage flux emanating from the end bell field poles of the machine into paths as close as possible to the main magnetic path, thereby avoiding electromagnetic interactions under the collector zone. A homopolar dynamoelectric machine constructed in accordance with this invention comprises: a rotor; an annular main field coil encircling a first portion of the rotor; a stator structure supporting the main field coil and having a main pole piece for directing magnetic flux, produced by current flowing in the main field coil, radially into a section of the rotor; a current transfer means making electrical contact with a current collecting zone on the surface of the rotor; and an annular auxiliary field coil encircling a second portion of the rotor wherein the first and second portions of the rotor are axially positioned on opposite sides of the current collecting zone such that current flowing in the auxiliary field coil reduces leakage flux, caused by current flowing in the main field coil, in the vicinity of the current collecting zone of the rotor.

DESCRIPTION OF THE PREFERRED EMBODIMENTS

Figure 1:
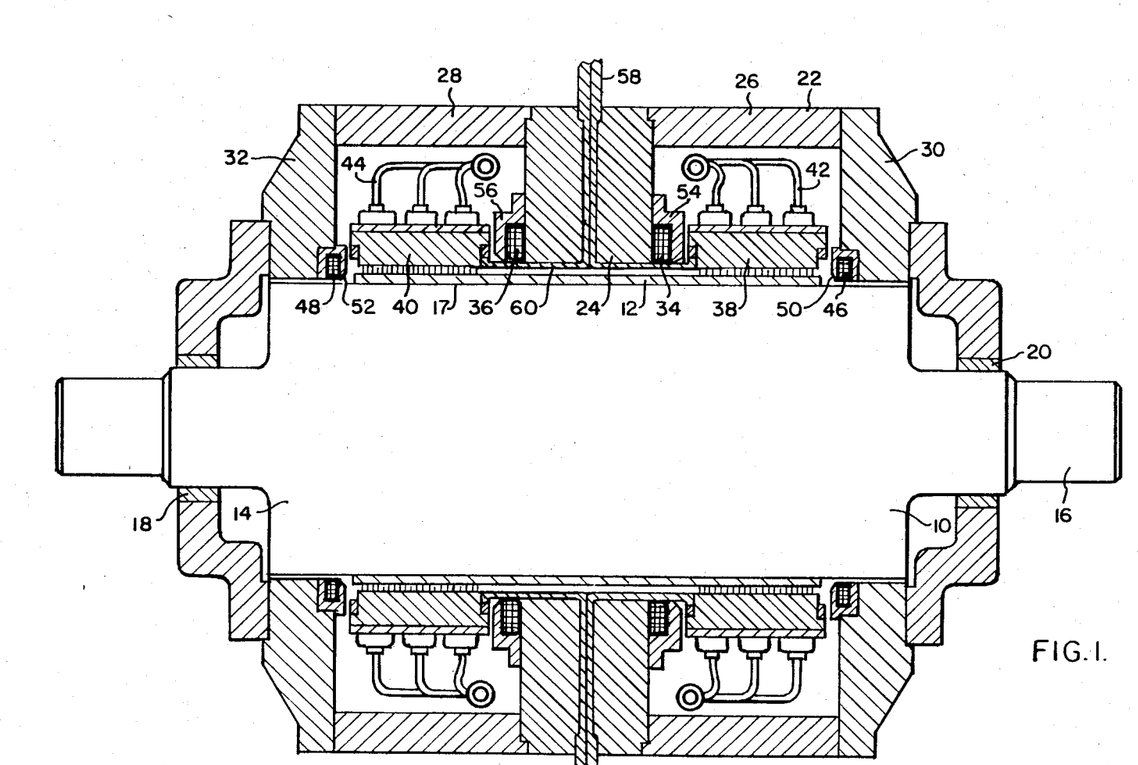
FIG. 1 is an axial cross section of a homopolar dynamoelectric machine constructed in accordance with one embodiment of the present invention.

Referring to the drawings, FIG. 1 is an axial cross section of a homopolar dynamoelectric machine constructed in accordance with one embodiment of the present invention. This machine includes a rotor 10 having a cylindrical shell 12 of a highly conductive non-ferromagnetic material which is bonded or shrunk onto a ferromagnetic inner cylindrical core 14 that serves as the main rotor body and is directly attached to a drive or input shaft 16. Insulation 17 is inserted between the shell and the core. The drive shaft 16 is supported by bearings 18 and 20 which are mounted in a stator structure 22. The stator structure 22 includes a main pole piece 24, stator yoke or back iron pole pieces 26 and 28, and return flux stator pole pieces 30 and 32. The main pole piece 24 is positioned to direct magnetic flux produced by current flowing through a pair of main excitation coils 34 and 36, radially into the central portion of the rotor. The flux produced by main field excitation coil 34 then travels axially through the rotor and into the return flux stator pole piece 30. Flux produced by main field excitation coil 36 travels axially through the rotor in the opposite direction and into the return flux stator pole piece 32. Current collection means in the form of brush assemblies 38 and 40 are positioned between the main stator field pole piece 24 and each return flux stator pole piece 30 and 32.

The brush assemblies may include either a singular brush box at each end of the machine as in low current machines, or preferably for a compact unit, may include a series of brush boxes spaced equally around the periphery to minimize the brush current density for a given total output current. Large homopolar machines may have in excess of 40 brush boxes per side spaced at intervals of 9° or less. Each brush box is associated with a brush lifting mechanism 42 and 44 which may be pneumatically operated. In general, all brush actuators will be connected in parallel and capable of simultaneously dropping of lowering the brushes with equal pressure and response time.

Auxiliary stator coils 46 and 48 are positioned adjacent to each return flux stator pole piece, on the opposite side of the rotor current collection zone as an associated one of the main stator field excitation coils. A flux shunt 50 and 52 is provided adjacent to each of the auxiliary field coils. The main field coils are provided with flux shunts 54 and 56. Conductors 58 and 60 connect the brush assemblies to an external circuit. In general, the main field coils and the auxiliary coils will be connected in series by additional conductors, not shown. Alternatively, in certain instances the main field coils and auxiliary coils may be connected in parallel.

The present invention utilizes auxiliary stator coils to minimize leakage flux surrounding the end bell field poles of a homopolar dynamoelectric machine and to constrain this amount of magnetic flux into paths as close as possible to the main magnetic path, thereby avoiding electromagnetic interactions under the current collector zone. A major reason that leakage flux is prominent in conventional homopolar generators is the widely accepted use of singular excitation, that is, main field coils which are adjacent to the central field pole piece on only one side of each machine sector. This in combination with relatively large, practical air gaps means that the shortest magnetic reluctance path for some lines of flux is through the brush current collector zone.

Figure 2:
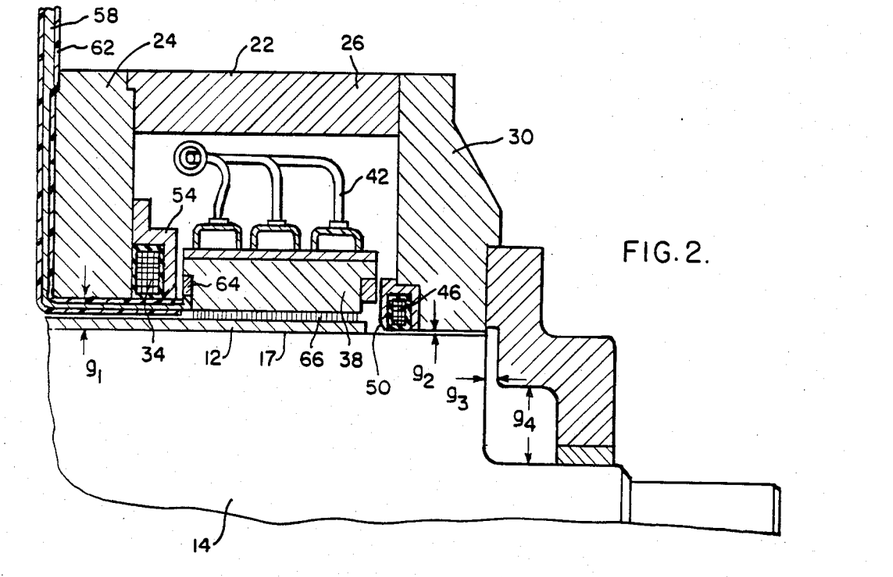
FIG. 2 is a partial axial cross section of the current collecting zone of the machine of FIG. 1.

The present invention overcomes the leakage flux problem by adding an auxiliary excitation coil having a fractional percentage of the ampere turns of the main excitation coil and located near the bearing or end bells. This auxiliary coil is capable of supporting magnetizing flux by directing this flux away from the current collector zone. FIG. 2 shows a partial cross-sectional view of the current collector region of the machine of FIG. 1. In this view, the circumferentially-wound auxiliary field coil 46 can be seen to be surrounded by the flux shunt 50 on three sides, leaving an open side which faces the rotor surface. It is understood that pieces 30 and 50 are both ferromagnetic strutural members with identical or similar magnetization characteristics. In this manner, both the main excitation coil and the auxiliary field coil and their respective surrounding structures resemble the lay-out of the main field coils in the previously-mentioned copending commonly-assigned application Ser. No. 677,768. It is the location of the auxiliary ampere turns in this invention which is different from all previous applications. The magnetomotive force distribution within the machine critically affects the overall output voltage. In short, the proper design of an auxiliary coil represents a compromise between maximizing output voltage and maximizing current collector capability in the presence of reduced, stray magnetic fields. The three main parameters dictating the relative strength of auxiliary excitation are dependent upon:

1. The total radial air gap between iron surfaces which has wide variations depending on whether either a solid steel rotor or highly conducting, non-ferromagnetic drum shrunk with insulation onto the rotor iron core is used;

2. The axial length of the collector-brush zone versus the possibly different radial electromagnetic air gap at each side of the collector zone; and 3. The relative cross-sectional area of the left-hand side main pole piece at the air gap with respect to the sum total cross-sectional area of the right-hand side return flux paths at the bearing end in both the radial and axial diections.

In FIG. 2, the current lead 58 is shown to be positioned at the axial center line of the machine and to be surrounded by insulation 62. This lead would parallel a similar lead from the other half of the unit with the exception that the flow of current in the two adjacent leads is in opposite directions. The shown placement of lead 58 minimizes leakage inductance of the lead system. This is desirable for minimizing the output or input current response time for fast energy transfer of the unit as a whole. Such leads would be typically composed of a highly conductive and non-ferromagnetic material such as copper with fiberglass or similar high strength electrical insulation wrapping the conductor on all four sides to isolate it from the stator structures. Conductor 58 is shown to be connected to brush box 38 by a collector ring 64 which extends a full 360° around the periphery of the machine. The current lead 58 may only access and contact the ring over a limited segment such as a 20° arc. Brush box 38 is shown to include a plurality of conductive fibers 66 which make the actual sliding electrical contact with the rotor surface.

Figure 3:
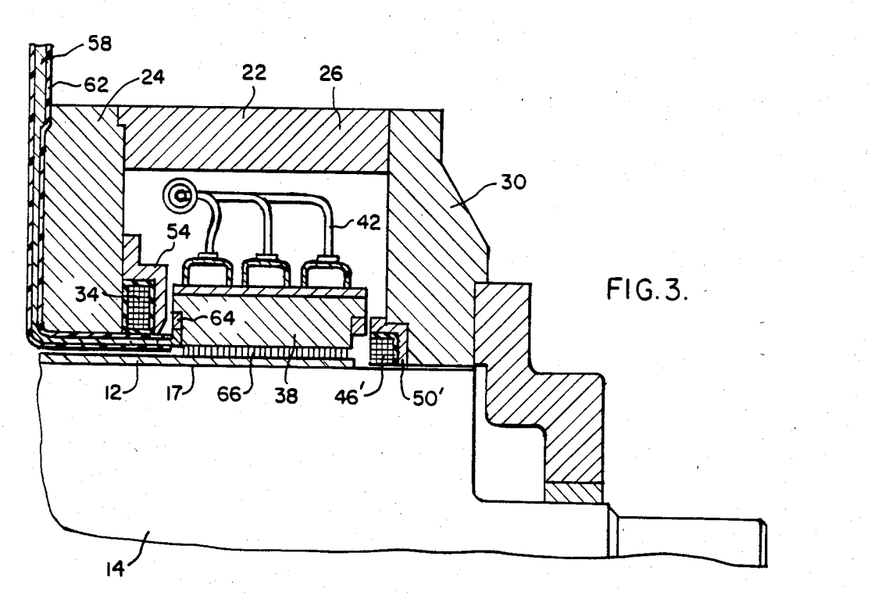
FIG. 3 is a partial axial cross section of the current collecting zone of a homopolar dynamoelectric machine constructed in accordance with an alternative embodiment of the present invention.

The use of an auxiliary excitation coil requires a modification of the end bell or return flux path magnetic structure but does not require an increase in machine overall axial length. In general, it is more space effective to add multiples of two auxiliary excitation coils per machine to compensate for the fringing field ampere turns than to allow the stray field to decay in air according to an exponential space attenuation function. FIG. 3 shows a partial cross-section of the current collecting zone of an alternative embodiment of the present invention wherein auxiliary coil 46' is shown to have an adjacent magnetic structural support piece 50' on only two sides. This arrangement is preferred where economy of manufacture or overall compactness is important. Piece 50' is necessary in the manufacturing process to ensure a high quality of coil mechanical stability and form.

Figure 4:
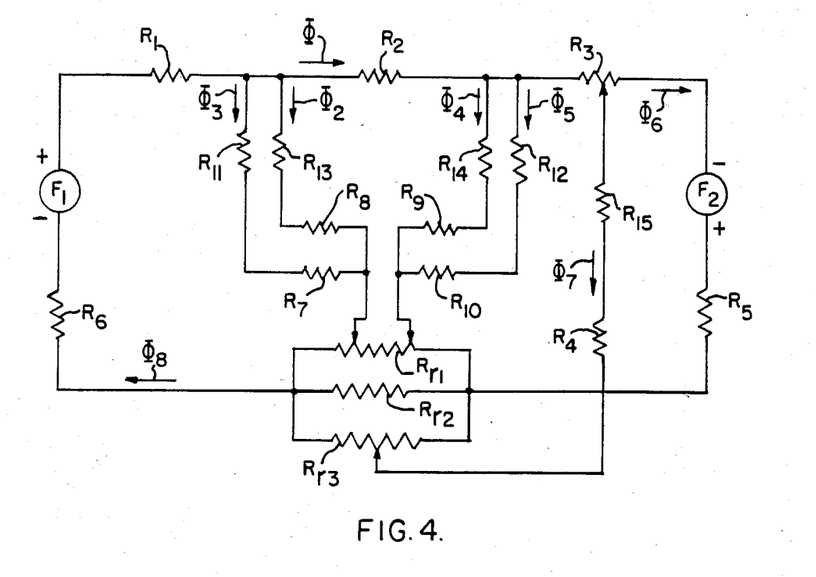
FIGS. 4, 5 and 6 are schematic diagrams of magnetic equivalent circuits of homopolar machines constructed in accordance with this invention.

FIG. 4 is a steady state magnetic equivalent circuit for a homopolar dynamoelectric machine having an auxiliary excitation coil enclosed by a magnetic flux shunt/support structure on three sides as illustrated in FIG. 2. In this circuit, $F_1$ represents the auxiliary coil magnetomotive force. In general, these magnetomotive forces should assume a definite relative strength in accordance with physical space or temperature rise limitations. In order to provide a more complete description of the present invention, Table I includes various dimensions for an example machine and Table II includes sample values for the reluctances shown in the magnetic equivalent circuit of FIG. 4.

TABLE I

Dimensions for Flux Distribution in Representative
40 MW Non-Truncated Drum Homopolar Generator
(All Dimensions in Meters)

| | |
|---|---|
| Airgap $g_1$ | 0.019 |
| Airgap $g_2$ | 0.00318 |
| Airgap $g_3$ | 0.010 |
| Airgap $g_4$ | 0.076 |
| Main Pole Height $H_1$ | 0.538 |
| Main Pole Width $L_1$ | 0.195 |

TABLE I-continued

Dimensions for Flux Distribution in Representative
40 MW Non-Truncated Drum Homopolar Generator
(All Dimensions in Meters)

| | |
|---|---|
| Return Pole Width, $L_2$ | 0.176 |
| Backiron Depth $H_3$ | 0.138 |
| Backiron Axial Length $L_3$ | 0.580 |
| Main Flux Shunt Iron Width, $L_4$ | 0.037 |
| Auxiliary Flux Shunt Iron Width, $L_5$ | 0.025 |
| Radius of Rotor Steel Core, $r_1$ | 0.490 |
| Radius of Rotor Over-Conductor, $r_2$ | 0.506 |
| Overall Length of Machine | 3.82 |
| Overall Diameter of Machine | 2.12 |

TABLE II

Representative Permeabilities and Magnetic Reluctances
Pertaining to Magnetic Circuit of FIG. 4

| Nomenclature | Reluctance ($H^{-1}$) | Relative Permeability, $\mu_r$ | Aux. Parameter |
|---|---|---|---|
| $R_1$ | 589 | 862 | |
| $R_2$ | 353 | 1550 | |
| $R_3$ | 668 | 862 | |
| $R_4$ | $7.58 \times 10^4$ | 1.0 | |
| $R_5$ | $4.64 \times 10^3$ | 1.0 | |
| $R_6$ | $2.42 \times 10^4$ | 1.0 | |
| $R_7$ | $4.51 \times 10^6$ | 1.0 | |
| $R_8$ | $3.28 \times 10^4/\epsilon_2$ | 1.0 | $\epsilon_2 = 0.00145$ |
| $R_9$ | $3.28 \times 10^4/\epsilon_2$ | 1.0 | $\epsilon_2 = 0.00145$ |
| $R_{10}$ | $4.28 \times 10^5$ | 1.0 | |
| $R_{11}$ | 3926 | 265 | |
| $R_{12}$ | 3672 | 265 | |
| $R_{r1}$ | 1563 | 940 | |
| $R_{r2}$ | 3366 | 870 | |
| $R_{r3}$ | 15,260 | 813 | |
| Composite $R_r$ | 998 | | |
| $R_{13}, R_{14}$ | $\simeq 5.0 \times 10^7$ | 1.0 | |

From an electromagnetic standpoint, the most basic criterion is that each magnetomotive force should be sized such that:

$$\frac{F_1}{F_2} \sim \frac{R_6}{R_5} = \frac{g_1/\mu_o 2\pi r_2 L_1}{g_2/\mu_o 2\pi r_1 L_2} \tag{1}$$

Figure 5:
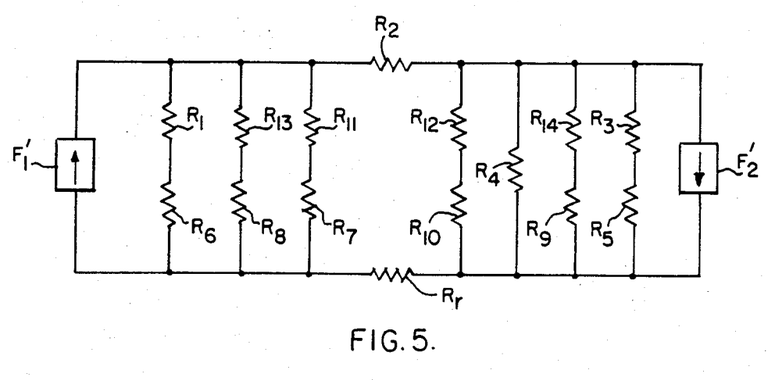
Figure 6:
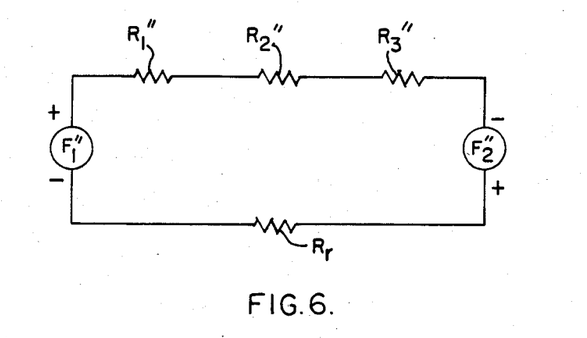
Figure 7:
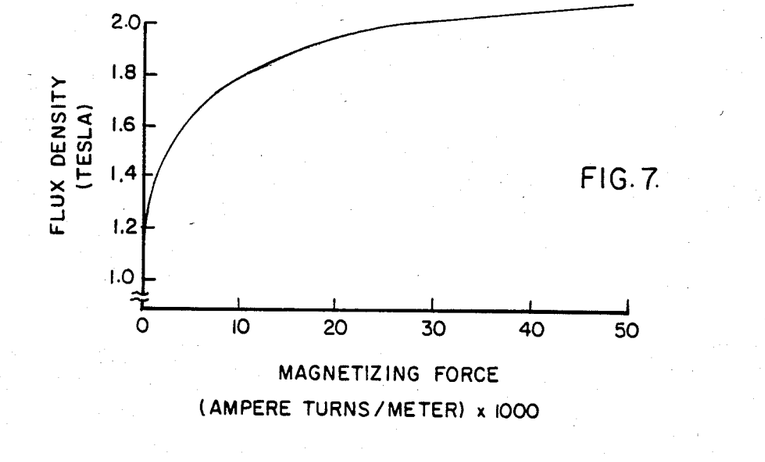
FIG. 7 and 8 are magnetization curves of machine components used in the preferred embodiment of this invention.
Figure 8:
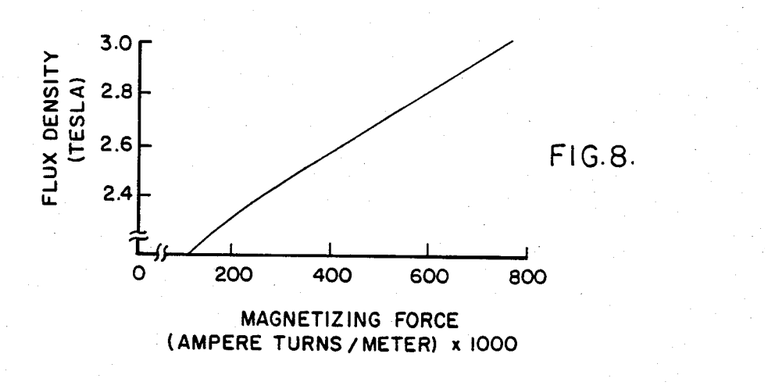
Figure 9:
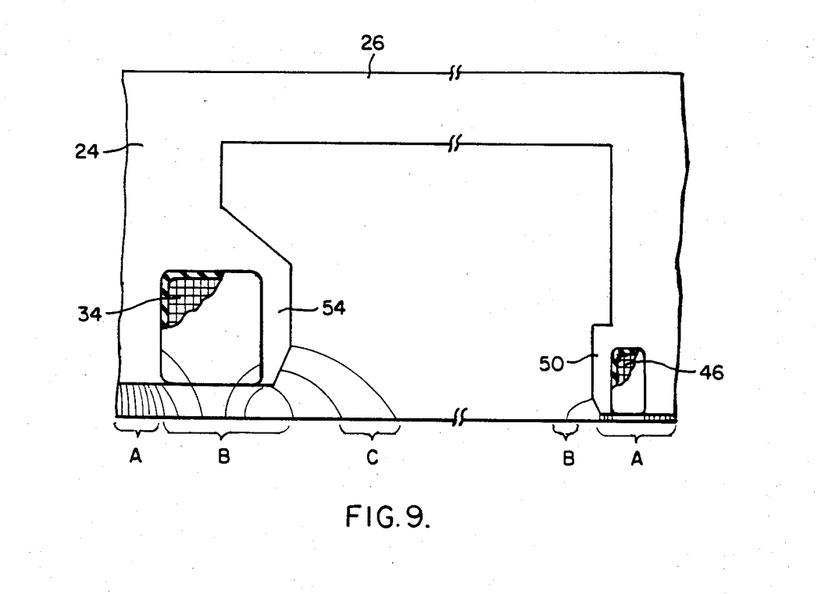
FIG. 9 is a flux plot used to estimate the amount of leakage flux which would occur in air around the main and auxiliary coil flux shunt pieces in the machines of this invention.

Since $R_5$ is normally less than $R_6$ due to the primary relationship that $g_2$ is less than $g_1$, in most practical applications, the secondary magnetomotive force source $F_2$ may be considerably smaller than $F_1$. For example, for a 40 megawatt homopolar generator similar to that shown in FIG. 2, with the dimensions of Table I, the ratio $g_2/g_1 = 0.17$ per unit. This indicates that the auxiliary excitation need to be only 17% of the main excitation except for minor differences in the pole area per side. For example, if a total of 20,000 ampere turns is required at base speed to produce nominal output voltage, then 17,094 ampere turns may be supplied from the main excitation coil and 2,906 ampere turns supplies from the auxiliary excitation coil, irrespective of rotational speed. The field intensity in the air gap, $g_1$, must be $7.96 \times 10^5$ amps per meter to produce a nominal 1.0 tesla density in this gap. This requires that 15,167 ampere turns is the net effective field excitation. The difference between 15,167 ampere turns and the total field magnetomotive force for $F_1$ may be regarded as leakage flux excitation, which in this case may be as high as 13%. If no leakage were present in the return pole, the density could go as high as 1.15 tesla in the gap $g_2$ if the full 2,906 ampere turns are used in the auxiliary coil. With the additional influence of iron saturation, the center field pole reluctance $R_1$, the stator yoke reluctance $R_2$ and the return pole piece reluctance $R_3$ as well as the rotor reluctances $R_{r1}$, $R_{r2}$, and $R_{r3}$ become important in modifying the basic ratio $F_1/F_2$ given in equation 1. When combined with the leakage reluctances across the brushes $R_8$ and $R_9$ and the reluctances of the air leakage paths in the brush holder region $R_{13}$ and $R_{14}$, with the reluctance of the end region air gaps $R_4$ set to infinity, it is possible to show the relative secondary excitation in the absence of flux shunt pole pieces at each field coil. In the circuit of FIG. 4, the overall objective is to reduce leakage flux quantities $\Phi_2$ and $\Phi_4$ to zero, to minimize shunt fluxes $\Phi_3$ and $\Phi_5$ and to equalize main fluxes $\Phi_1$, $\Phi_6$ and $\Phi_8$. To illustrate the effect of source $F_2$, the circuit of FIG. 4 must be first reduced to the Norton equivalent current source representation shown in FIG. 5 where it can be seen that auxiliary excitation source $F_2'$ has four shunting reluctance paths and main source equivalent $F_1'$ has three shunting reluctance paths. The basic purpose of the present invention is to maximize the cumulative shunt reluctance directly across source $F_2'$ as well to maximize the cumulative shunt reluctance across source $F_1'$ while maintaining low values for elements $R_2$ and $R_r$. The steady state circuit may be further reduced to that shown in FIG. 6 with the following Thevenin equivalent MMF sources.

$$F_1'' = \frac{F_1(R_{13} + R_8)}{R_1 + R_6 + R_8 + R_{13}} \tag{2}$$

and the secondary excitation Thevenin source is $$F_2'' = \frac{F_2(R_9 + R_{14})}{R_3 + R_5 + R_9 + R_{14}} \tag{3}$$

The singular path consists of the following four serial elements $$R_1'' = \frac{(R_1 + R_6)(R_8 + R_{13})}{R_1 + R_6 + R_8 + R_{13}} \tag{4}$$

$$R_3'' = \frac{(R_3 + R_5)(R_9 + R_{14})}{R_3 + R_5 + R_9 + R_{14}} \tag{5}$$

$$R_r = \frac{R_{r1} R_{r2} R_{r3}}{R_{r1} + R_{r2} + R_{r3}} \tag{6}$$

wherein the stator yoke reluctance $R_2$ remains the same as in FIG. 4. To arrive at the dimensions and reluctances of Tables I and II, the stator and rotor members have been assumed to be constructed of a type 1492 steel having the magnetization characteristic illustrated in FIGS. 7 and 8. The flux plot of FIG. 9 was used to estimate the amount of leakage flux through air occurring around the flux shunt pieces adjacent to the two coils in each side of the homopolar machine. Three basic types of magnetic flux lines have been categorized. The type A lines represent flux which crosses the air gap in substantially radial directions. Type B lines represent flux that cuts portions of the main excitation coil and positively contributes to the working flux supporting the machine EMF but has reluctance paths which are two or three times the path of the main air gap flux. Type C lines also contribute to the main flux in supporting EMF since they enter the rotor surface. However, the rotor surface entry positions are detrimental to the operation of the current collecting system. That is, the type C lines are primarily responsible for inducing circulating currents in the brush gear due to the large axial component of flux orientation. The basic configuration shown in FIG. 9 has been designed to minimize the type C flux lines, to maximize the type A lines and to compromise the two locations of the type B lines in accordance with practical main and auxiliary coil cross-sectional dimensions. Although the present invention has been described in terms of what are at present believed to be its preferred embodiments, it will be apparent to those skilled in the art that various changes may be made without departing from the scope of the invention. For example, in certain instances, the magnetic flux shunt 50 in FIGS. 1 or 2 adjacent to the auxiliary field coil may be deleted. Such an arrangement would produce a higher stray field along the current collector surface but in machines where the output current is relatively low such that only two brush holders are used instead of the three shown in FIG. 2, then over a current collection distance of, for example, 0.25 meters, the reduction in stray field would be mainly accomplished by the presence of the auxiliary coil. Although the preferred embodiment of this invention includes metallic brushes and a rotor having a conductive shell, it should be understood that alternative current collecting means such as fluidic contacts, and alternative rotors such as a solid iron rotor also fall within the scope of this invention. It is intended that the appended claims cover all such alternative designs.

What is claimed is:

1. A homopolar dynamoelectric machine comprising:
 a rotor;
 an annular main field coil encircling a first portion of said rotor;
 a stator structure supporting said main field coil and having a main pole piece for directing magnetic flux, produced by current flowing in said coil, radially into a section of said rotor;
 a current transfer means making electrical contact with a current collecting zone on the surface of said rotor;
 an annular auxiliary field coil encircling a second portion of said rotor wherein said first and second portions of said rotor are axially positioned on opposite sides of said current collecting zone such that current flowing in said auxiliary field coil reduces leakage flux, caused by current flowing in said main field coil, in the vicinity of said current collecting zone of the rotor; and
 an auxiliary field coil flux shield positioned adjacent to said auxiliary field coil, wherein said auxiliary field coil has a generally rectangular cross section with one side of said auxiliary field coil lying adjacent to said rotor and said auxiliary field coil flux shield being shaped to conform to the other three sides of said auxiliary field coil.

2. A homopolar dynamoelectric machine as recited in claim 1, wherein said rotor comprises:
 a ferromagnetic cylindrical core; and
 a conductive, non-ferromagnetic shell mounted on said core.

3. A homopolar dynamoelectric machine as recited in claim 1, wherein said stator structure includes:
 a magnetic flux path extending from said main pole piece to an end pole piece, said end pole piece being positioned adjacent to one end of said rotor and on the opposite side of said current collecting zone from said main pole piece to direct magnetic flux axially through the adjacent rotor end.

4. A homopolar dynamoelectric machine as recited in claim 1, wherein said main field coil is positioned axially between said main pole piece and the current collecting zone of said rotor.

5. A homopolar dynamoelectric machine as recited in claim 1, wherein said current transfer means comprises:
a plurality of brush members electrically connected in parallel to a brush collector ring, wherein said brush collector ring extends arcuately around at least a portion of said rotor adjacent to said current collecting zone.

6. A homopolar dynamoelectric machine comprising:
a rotor;
an annular main field coil encircling a first portion of said rotor;
a stator structure supporting said main field coil and having a main pole piece for directing magnetic flux, produced by current flowing in said coil, radially into a section of said rotor;
a current transfer means making electrical contact with a current collecting zone on the surface of said rotor;
an annular auxiliary field coil encircling a second portion of said rotor wherein said first and second portions of said rotor are axially positioned on opposite sides of said current collecting zone such that current flowing in said auxiliary field coil reduces leakage flux, caused by current flowing in said main field coil, in the vicinity of said current collecting zone of the rotor; and
a main field coil magnetic flux shield positioned adjacent to said main field coil, wherein said main field coil has a generally rectangular cross section with one side of said main field coil lying adjacent to said main pole piece, a second side of said main field coil lying adjacent to said rotor and said main field coil flux shield being shaped to conform to the third and fourth sides of the main field coil.

7. A homopolar dynamoelectric machine as recited in claim 6, wherein said rotor comprises:
a ferromagnetic cylindrical core; and
a conductive, non-ferromagnetic shell mounted on said core.

8. A homopolar dynamoelectric machine as recited in claim 6, wherein said stator structure includes:
a magnetic flux path extending from said main pole piece to an end pole piece, said end pole piece being positioned adjacent to one end of said rotor and on the opposite side of said current collecting zone from said main pole piece to direct magnetic flux axially through the adjacent rotor end.

9. A homopolar dynamoelectric machine as recited in claim 6, further comprising:
an auxiliary field coil flux shield positioned adjacent to said auxiliary field coil, wherein said auxiliary field coil has a generally rectangular cross section with one side of said auxiliary field coil lying adjacent to said rotor and said auxiliary field coil flux shield being shaped to conform to the other three sides of said auxiliary field coil.

10. A homopolar dynamoelectric machine as recited in claim 6, wherein said main field coil is positioned axially between said main pole piece and the current collecting zone of said rotor.

11. A homopolar dynamoelectric machine as recited in claim 6, wherein said current transfer means comprises:
a plurality of brush members electrically connected in parallel to a brush collector ring, wherein said brush collector ring extends arcuately around at least a portion of said rotor adjacent to said current collecting zone.

* * * * *